June 16, 1936.  J. B. BRENNAN  2,044,379
PISTON
Filed Nov. 21, 1932   2 Sheets-Sheet 1
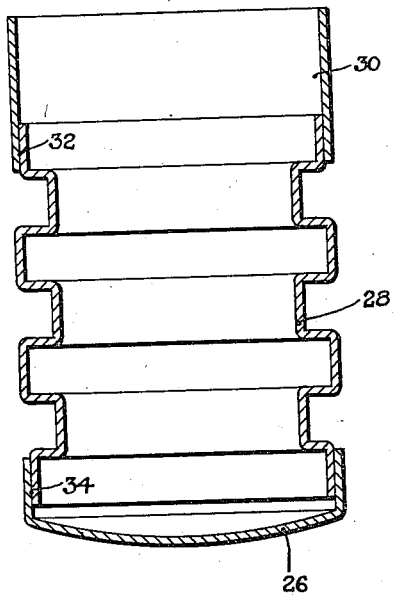
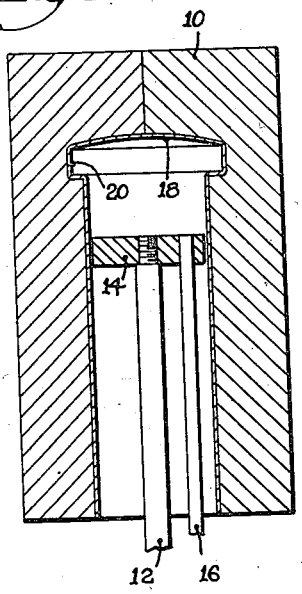 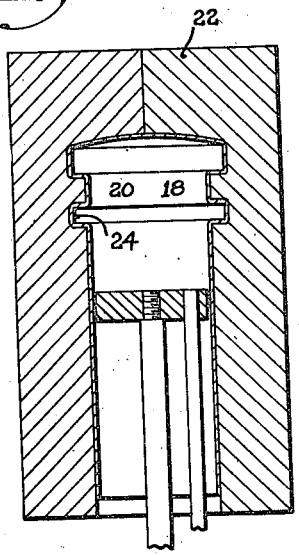
Witness
H. E. Van Dine.
Inventor
Joseph B. Brennan June 16, 1936.  J. B. BRENNAN  2,044,379
PISTON
Filed Nov. 21, 1932   2 Sheets-Sheet 2
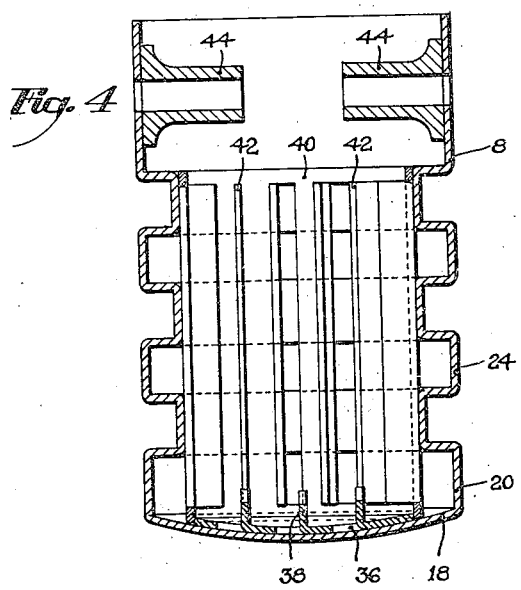
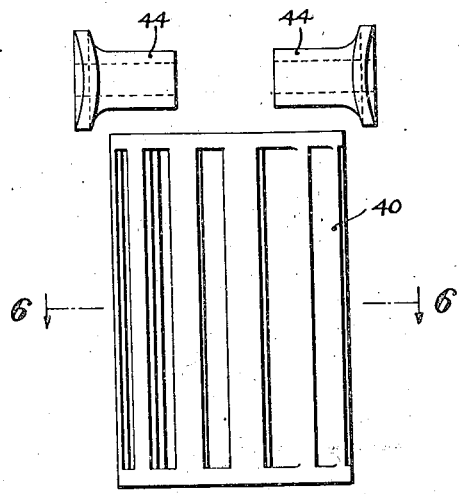
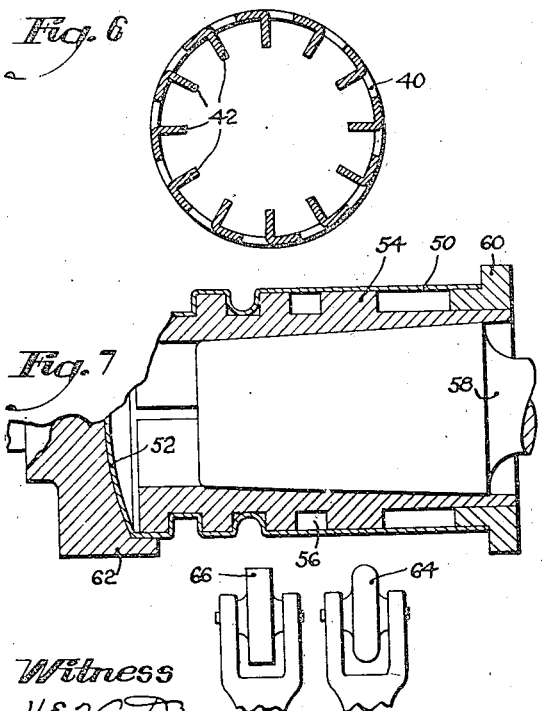
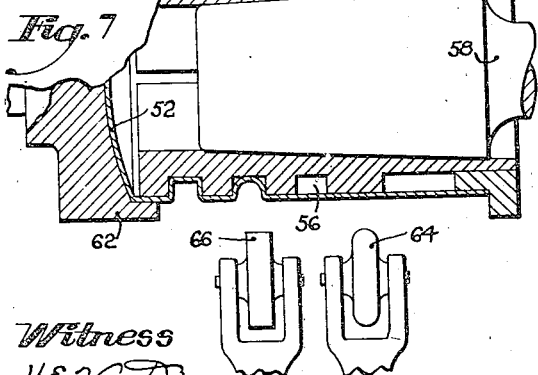
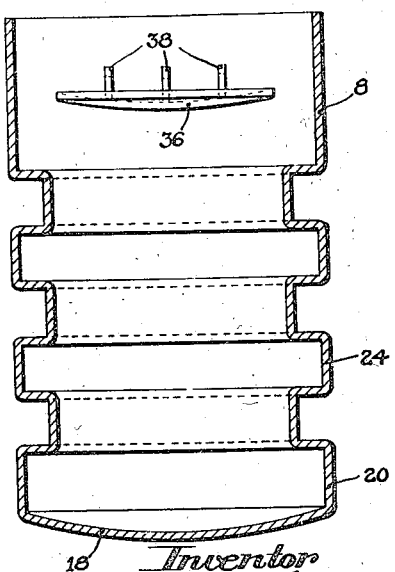

Patented June 16, 1936

2,044,379

UNITED STATES PATENT OFFICE 2,044,379

PISTON

Joseph B. Brennan, Fort Wayne, Ind.

Application November 21, 1932, Serial No. 643,638

3 Claims. (Cl. 309—14)

The present invention relates to pistons and methods of making the same.

The principal object of the present invention is to provide a piston of light weight, high strength and resistance to warping, and of uniform accuracy in size.

With this object in view, the principal feature of the invention comprises a sheet metal piston which is fabricated from a tubular member by hydraulic expansion or by mechanical rolling. In one form of the invention, the piston is made up of a number of pre-formed sections which are accurately secured together by welding or brazing.

Another feature of the invention contemplates the use of internal heat radiating members to dissipate heat from areas of high temperature, thereby resulting in lower oil consumption and maintenance of accurate clearance between the piston and the cylinder wall.

Other features of the invention consist of certain novel features of construction, combinations and arrangement of parts hereinafter described and particularly defined in the claims.

In the accompanying drawings, Fig. 1 is a sectional elevation of a built-up piston according to the present invention; Figs. 2 and 3 are detail sectional views of molds for forming an integral piston by hydraulic expansion; Fig. 4 is a sectional elevation showing the wrist pin bearings and cooling fins in place; Fig. 5 is a developed view showing the construction of the piston and method of assembling of the cooling members; Fig. 6 is a section on line 6—6 of Fig. 5; and Fig. 7 is a diagrammatic view illustrating the method of making a piston by mechanical rolling.

According to the preferred method of manufacture of the piston of integral form, such as is shown at 8 in Figs. 4 and 5, a seamless drawn closed end tube is inserted in a split mold 10 of the shape shown in Fig. 2. A plunger 12 having a head 14 slides within the tube and liquid is conducted into the interior of the tube by a flexible pipe 16. The mold sections 10 are formed to produce the rounded head 18 and the annular ring portions 20 of the piston. Liquid is admitted to the interior of the tube and pressure is applied to the plunger 12, thereby expanding the metal and causing a flow thereof into the recesses of the mold. The partly fabricated piston is then removed to a mold 22 of the shape indicated in Fig. 3, which is formed to enclose the previously shaped head and ring portions 18 and 20 of the piston. The mold 22 is also formed of an annular recess portion to form an annular ring 24 on the piston. A set of molds is provided to form the annular portions 20, 24, etc., in the same manner, thereby producing a piston of the shape shown in Figs. 4 and 5. The grooves between adjacent annular flanges constitute the grooves for receiving the piston rings which are placed in the usual manner.

A modified form of the piston is shown in Fig. 1 in which a head portion 26, a barrel portion 28, and a skirt portion 30 are separately formed. The head portion 26 may be constructed in a mold similar to that shown in Fig. 2, the barrel portion 28 in a series of molds similar to those shown in Figs. 2 and 3, and the skirt portion 30 is merely a section of drawn tubing of accurate size. The head portion 26 and the skirt portion 30 are secured to opposite ends of the barrel portion 28 preferably by copper brazing. This is accomplished by copper plating or bronzing the section, fitting the parts together and heating in a hydrogen atmosphere. Although any method of securing, such as welding, may be employed, the copper brazing method is deemed preferable because of the accuracy with which the parts may be joined. It will be noted that the upper and lower flanges 32 and 34 of the barrel portion are of smaller diameter than the other flanged portions in order that the edges of the skirt and head may be flush with the peripheral surfaces of the barrel portion.

According to one of the features of the invention, the interior of the piston is provided with cooling fins of the construction shown in Figs. 4 to 6 inclusive.

Attached to the interior of the head portion piston is a disk 36 which has struck-up transverse fins 38. The disk is rounded to conform to the internal surface of the head and is suitably attached thereto by copper brazing. Also received in the piston is a sleeve member 40 of an external diameter to fit closely within the ring grooves. The sleeve member is formed with a plurality of internal projecting fins 42 which are struck up from the material of the sleeve. The sleeve fits closely around the disk 36 and within the internal surfaces of the piston. The sleeve is secured in place by welding or by copper brazing. Received in the skirt portion is a pair of closed wrist pin bearings 44 which are also secured in place by brazing.

The provision of the cooling fins results in a rapid dissipation of heat from the piston. In the usual constructions, the piston comprises a considerable body of material which is rapidly heated to a high temperature. Because of the fact that heat can be dissipated only through the oil film and the cylinder wall to the water jacket, the piston temperature is higher than that of surrounding parts and may result in warping of the piston and a rapid deterioration of the oil results. According to the present invention, heat is radiated from areas of the highest temperature internally of the piston, thereby diminishing the temperature of the oil film. The normal movement of the pistons causes sufficient circulation of air from the crank case to effect substantial cooling. The pistons operate at a minimum range of temperature under varying conditions, and may therefore be fitted with greater accuracy and less clearance than pistons of the usual types.

The piston may, if desired, be formed by mechanical rolling of a drawn tube, as illustrated in Fig. 7. The tube 50 with a pre-formed dome-shaped head 52 is mounted on an expansion die 54 which is provided at intervals with grooves 56. The die is expanded by the expanding shaft 58. A follow-up ring 60 engages the end of the tube to take care of the flow of metal during the rolling operation. The tube and die are mounted in the chuck 62 and the grooves are rolled by means of rollers 64 and 66. The roller 64 is a round edge roller for initiating the formation of the grooves and the roller 66 is a square edge roller for finishing the grooves with parallel sides. As illustrated in the drawings, the first groove at the left has been completely formed by the action of both rollers and the second groove has been acted on only by the round edge roller 64. After formation of the grooves, the piston is released from the chuck and the expansion die.

It will be noted that whichever method of manufacture is used, the piston is formed with parallel sided corrugations forming the ring grooves. The walls of the corrugations are of substantially the same thickness as the walls of the other parts of the piston, as distinguished from the common cast piston, in which the walls must be of sufficient thickness to accommodate the cut grooves. Accordingly, the piston of the present invention may be made of minimum weight and inertia, and of maximum resistance to warping under the severe temperature conditions encountered in an internal combustion motor.

Having thus described the invention, what is claimed is:

1. A piston comprising a sheet metal hollow body with annular ring grooves, and a sleeve fitted internally of the body and engaging the internal walls of the body at points of smallest diameter, the sleeve having fins integrally formed thereon and extending inwardly from the walls.

2. A piston comprising a hollow body portion having a head and side walls, and a sheet metal disk secured internally of the head and provided with struck-out fins extending inwardly from the head.

3. A piston comprising a sheet metal hollow body having a head, a disk secured internally of the head and having fins extending inwardly from the head, the body having annular ring grooves, and a sleeve fitted internally of the body and engaging with the body at points of smallest diameter, the sleeve having inwardly extended fins.

JOSEPH B. BRENNAN.